A. N. HOSLET & A. LIBERT.
GOVERNOR FOR REGULATING THE REVOLUTIONS OF A SHAFT.
APPLICATION FILED MAR. 14, 1910.
1,004,431.
Patented Sept. 26, 1911.
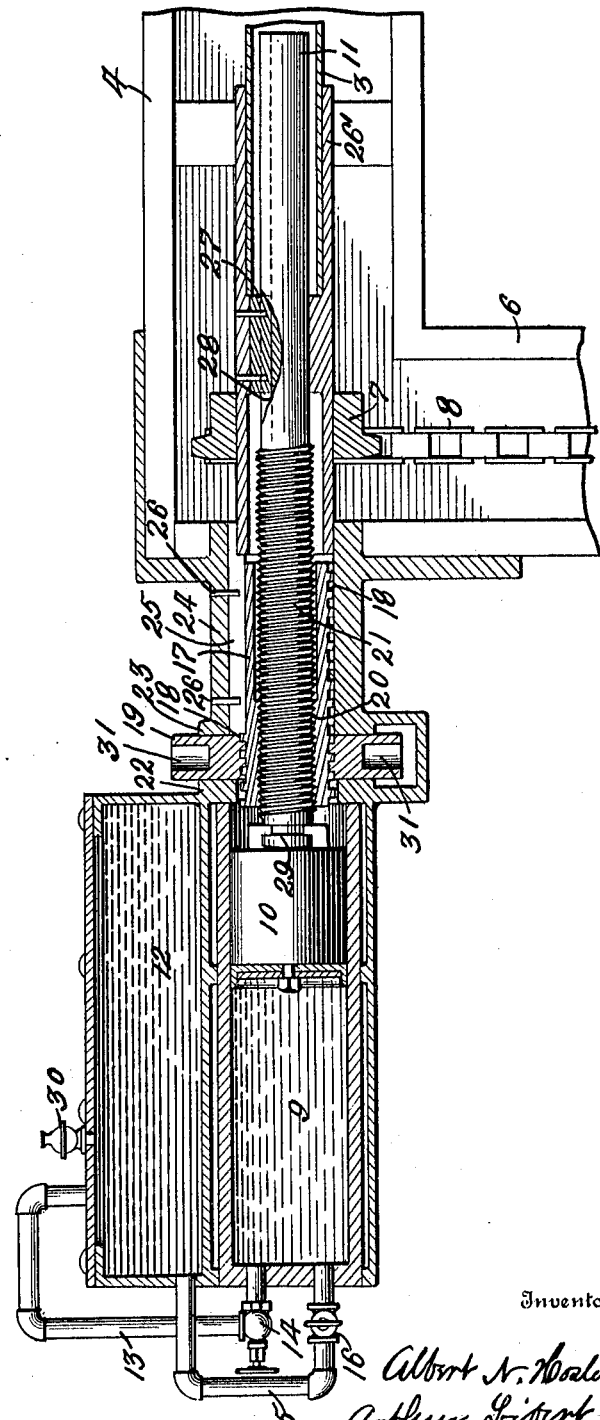

UNITED STATES PATENT OFFICE.

ALBERT N. HOSLET AND ARTHUR LIBERT, OF GREEN BAY, WISCONSIN.

GOVERNOR FOR REGULATING THE REVOLUTIONS OF A SHAFT.

1,004,431.  Specification of Letters Patent.   Patented Sept. 26, 1911.

Application filed March 14, 1910. Serial No. 549,311.

*To all whom it may concern:*

Be it known that we, ALBERT N. HOSLET and ARTHUR LIBERT, citizens of the United States, residing at Green Bay, county of Brown, and State of Wisconsin, have invented new and useful Improvements in Governors for Regulating the Revolutions of a Shaft, of which the following is a specification.

Our invention relates to improvements in governors for regulating the revolution of a shaft, and the same is more especially adapted to be used with devices for lowering burial caskets, which is more fully explained by reference to the accompanying drawings in which the figure is a plan view, part in section, of the governing device.

Our governing device comprises, among other things, the cylinder 9, piston 10, piston rod 11, tank 12, outlet duct 13, leading from said cylinder to said tank, needle valve 14, return duct 15 communicating between said tank and said cylinder through which the liquid flows from said tank back to said cylinder, and liquid controlling valve 16.

17 is a sleeve, which is provided on its exterior surface with a screw thread 18, upon which the nut 19 operates. The sleeve 17 is also provided with an interior screw thread 20 for the reception of the screw thread 21, which screw thread 21 is formed on the piston rod 11. The nut 19 is adapted to be revolved between the two stationary side bearings 22 and 23, whereby as it is turned in one direction on the thread of the sleeve 17, said sleeve, together with the piston rod and piston are moved forward, whereby the piston is caused to bear firmly against the contents of the cylinder when the outlet duct is closed, so that when the casket is placed on the straps, said straps and the parts connected therewith, will be prevented from moving further until the needle valve 14 is opened, as they might otherwise do if a space was left in the cylinder in front of the piston before starting the device. The sleeve 17 is slidably keyed to the inclosing casing 24 by the longitudinal key 25, which key is held in place by the pins 26, 26, whereby it is prevented from turning as the piston rod is revolved, while the piston rod, together with the piston 10, are moved forward in the cylinder 9.

Motion is communicated to the piston rod 11 from the shaft 3 as the casket descends, through the sleeve 26' and spline 27, which spline is rigidly affixed to said sleeve and operates in the longitudinal groove 28 of the piston rod. Thus it will be understood that as the casket descends, the shaft 3, sleeve 26, and the piston rod 11, all revolve together, while the piston is caused to move forward by the action of the threaded piston rod operating in the threaded sleeve 17, whereby the piston 10 is pushed forward against the liquid in said cylinder, while the forward movement of said piston is controlled by the escape of the liquid from the cylinder and the escape of the liquid from the cylinder to the tank is controlled by the adjustment of the needle valve 14. The sprocket wheel 7 is connected with the hollow shaft 3 through the said sleeve 26' motion being communicated by the gravity of the casket or other source of power, to said sprocket wheel 7, through the sprocket chain 8.

4 represents the side, and 6 represents the end members of the frame upon which our device is supported.

The piston 10 is connected with the piston rod 11 through an ordinary swivel 29, whereby the rod is free to turn without turning the piston as the same is forced forward in the cylinder.

30 is a valve through which air is free to pass as the liquid passes to and from the tank 12.

The nut 19 is provided with a plurality of radial sockets 31 for the reception of an operating tool by which such nut is turned.

When the casket has been lowered, the valves 16 and 30 are opened, when the shaft 3 is revolved in the opposite direction, whereby the piston 10 will be drawn back to its original position shown in Fig. 4 and a partial vacuum will be formed in the cylinder 9, when the liquid which has been discharged by the forward movement of the piston will be caused to flow back from the tank 12 into said cylinder, preparatory to being used again.

Having thus described our invention, what we claim as new, and desire to secure by Letters Patent, is—

1. In a governor for casket lowering devices, the combination of a revoluble shaft, a cylinder, a piston located in said cylinder, a liquid located in front of said piston in said cylinder, a tank for the reception of said liquid when forced from said cylinder, a piston rod revolubly connected at one end with said piston and slidably connected at its opposite end with said revoluble shaft, means for communicating a revoluble movement from said shaft to said piston rod, said piston rod being provided near its opposite end with a screw thread, a non-revoluble screw threaded sleeve, the thread of which operates on the screw thread of said piston rod, and means for regulating the flow of liquid from said cylinder to said tank, whereby the speed of said revoluble shaft is controlled.

2. In a governor for casket lowering devices, the combination of a revoluble shaft, a cylinder, a piston located in said cylinder, a liquid located in front of said piston in said cylinder, a tank for the reception of said liquid when forced from said cylinder, a piston rod revolubly connected at one end with said piston and slidably connected at its opposite end with said revoluble shaft, means for communicating a revoluble movement from said shaft to said piston rod, said piston rod being provided near its opposite end with a screw thread, a non-revoluble screw threaded sleeve, the thread of which operates on the screw thread of said piston rod, a nut having a screw thread on the exterior of said non-revoluble sleeve and being adapted to be manually revolved between two fixed bearings, whereby as said nut is turned, said non-revoluble sleeve, piston and piston rod will be moved forwardly before the liquid controlling valve is opened and until stopped by the confined liquid in said cylinder, and means for regulating the flow of liquid from said cylinder to said tank, whereby the speed of said revoluble shaft is controlled.

In testimony whereof we affix our signatures in the presence of two witnesses.

ALBERT N. HOSLET.
ARTHUR LIBERT.

Witnesses:
GREG. COLLARD,
FRANCIS J. JONET.

---

Copies of this patent may be obtained for five cents each, by addressing the "Commissioner of Patents, Washington, D. C."